(12) United States Patent
Tatum et al.

(10) Patent No.: US 6,674,941 B2
(45) Date of Patent: Jan. 6, 2004

(54) OPTICAL COUPLING FOR OPTICAL FIBERS

(75) Inventors: Jimmy A. Tatum, Plano, TX (US); James K. Guenter, Garland, TX (US)

(73) Assignee: Honeywell International Inc., Morristown, NJ (US)

( * ) Notice: Subject to any disclaimer, the term of this patent is extended or adjusted under 35 U.S.C. 154(b) by 8 days.

(21) Appl. No.: 10/026,271

(22) Filed: Dec. 21, 2001

(65) Prior Publication Data

US 2003/0118282 A1 Jun. 26, 2003

(51) Int. Cl.[7] .................................................. G02B 6/42
(52) U.S. Cl. .......................... 385/33; 385/27; 385/39; 385/88; 385/31
(58) Field of Search ........................ 385/31, 33, 34, 385/35, 15, 27–29, 38, 39, 49, 88; 372/6

(56) References Cited

U.S. PATENT DOCUMENTS

| | | | |
|---|---|---|---|
| 4,934,787 A * | 6/1990 | Ichimura et al. ............... | 385/27 |
| 5,044,717 A * | 9/1991 | Levatter ........................ | 385/33 |
| 5,117,472 A * | 5/1992 | Blyler et al. .................... | 385/28 |
| 5,138,675 A * | 8/1992 | Schofield ....................... | 385/28 |
| 5,395,362 A * | 3/1995 | Sacharoff et al. ........... | 600/108 |
| 5,892,866 A * | 4/1999 | Bristow et al. ............... | 385/28 |
| 6,208,678 B1 * | 3/2001 | King ........................... | 372/72 |
| 6,418,251 B1 * | 7/2002 | Boscha ......................... | 385/31 |

FOREIGN PATENT DOCUMENTS

JP        58207017 A  * 12/1983  ............ G02B/7/26

\* cited by examiner

*Primary Examiner*—Hemang Sanghavi
*Assistant Examiner*—Scott Knauss
(74) *Attorney, Agent, or Firm*—Andrew A. Abeyta; Ortiz & Lopez PLLC (57) ABSTRACT

A method and system for coupling a laser (e.g., vertical cavity surface emitting laser (VCSEL)) to an optical fiber is disclosed. A plurality of optical modes associated with a laser, e.g., a VCSEL, are scrambled, and radiation from the VCSEL can be focused on a fiber facet associated with the optical fiber. Thereafter, the VCSEL can be coupled to the optical fiber to thereby improve coupling repeatability while reducing mode selective coupling of the VCSEL to the optical fiber. The optical modes can be scrambled utilizing an optical scattering surface. Such an optical scattering surface can produce a Lambertian-like scattering source such that optical modes thereof are combinable to form a plurality of optical modes. The VCSEL can be coupled to said optical fiber by butt-coupling said optical fiber to the multimode VCSEL through a receiver formed in a housing for the VCSEL and/or by utilizing at least one lens for imaging radiation/signals onto a particular spot. Additionally, such a spot generally comprises a size larger than a core of said optical fiber to thereby reduce coupling variations thereof. The optical modes may also be scrambled utilizing an optical concentrator configured as a linear, conical, parabolic, or other shaped concentrator, which can be adapted for use in mixing optical modes. The optical modes can also be mixed utilizing an optical scattering surface to provide a Lambertian-like scattering source.

7 Claims, 6 Drawing Sheets

OPTICAL COUPLING FOR OPTICAL FIBERS

TECHNICAL FIELD

The present invention is generally related to optical coupling methods and systems for optical fibers. The present invention is also related to techniques and devices thereof for coupling a vertical cavity surface emitting laser (VCSEL) to an optical fiber. The present invention is also related to single-mode and multimode VCSEL devices. The present invention is further related to optical scattering devices and optical concentrators.

BACKGROUND OF THE INVENTION

Optical fiber technology is used in a variety of applications such as telecommunication, computer, and medical applications. An important aspect of optical fiber technology is the coupling of an optical fiber to an optoelectronic device for transmitting information conducted by the optical fiber.

Optical fibers are typically arranged in a bundle of individual fibers and protected by a sheath. Such a bundle of optical fibers is often referred to as an optical cable. The light receiving and emitting ends of the optical fibers are housed in fiber ferrules. The fiber ferrule at the light-receiving end of the fiber can be coupled generally to a light-emitting device or source via an optical interface unit. Likewise, the fiber ferrule at the light-emitting end of the individual fibers is generally coupled to a light-detecting device via an optical interface unit.

A drawback of these systems is the large number of optical interface or coupling points through which the optical signals pass. In currently available systems, optical signals can pass through at least four interfaces, i.e., interfaces between the optical interface units and the light emission and detection devices and interfaces between the optical interface units and the fiber ferrules. Each time the optical signal passes through an optical interface, a portion of the signal is typically lost, thereby degrading the quality of the optical signals transmitted in optical fibers.

In addition, for convenience and space efficiency, it is generally preferred to arrange optical fibers parallel to a circuit board. Therefore, when a vertical light emitting or detection device such as, for example, a vertical cavity surface emitting Laser (VCSEL) or photo detector is coupled to optical fibers, the chip that includes the vertical light emitting or detection device is generally mounted perpendicular to the circuit board. The perpendicular orientation of the vertical light emitting or detection device can be accomplished by several means, e.g., flexible circuits using tape automated bonding (TAB), electrically patterned submounts connected to the circuit board, etc. However, flexible circuits and submounts are additional components that are often expensive. Furthermore, flexible circuits and submounts increase the electronic paths of the light emitting or detection devices and, therefore, can degrade their performance.

Communications systems employing optical fibers are thus well known in the art. These systems typically transmit data by using a light source, such as a laser, to emit pulses of light onto a waveguide. The waveguide, often implemented as a glass fiber, transmits the light pulses to an optical receiver that senses the pulses of light and provides a corresponding output signal (typically an electrical signal) to a receiving system.

Optical communications systems may span large geographic regions, or they may be implemented within single electronic components. Vertical cavity surface emitting lasers (VCSELs) have been recognized as being useful in small-scale communications systems. Indeed, it has been suggested that optical systems utilizing VCSELs may eventually replace many systems that currently rely upon copper wires to transmit electrical data signals. The advantages of optical communications systems over electrical systems commonly include high bandwidth and low signal loss, which often results as optical data signals travel through the fiber. Moreover, several optical fibers may be bundled together in a "fiber array" to form a communications channel that is capable of transmitting multiple signals simultaneously.

An important element of any optical communications system is a method of coupling light emanating from a light source into the waveguide. Typically, a laser light source can be coupled into an optical fiber in a "header block" arrangement. The most commonly used form of header uses the well-known "butt-coupling" method. "Butt-coupling" involves positioning the laser so that light is directly emitted into an end of the optical fiber. Typically, a substrate made of silicon, plastic, ceramic or another material supports the laser and at least a portion of the optical fiber. The "butt-coupling" method is particularly suited for use with edge emitter lasers that emit photons in an elliptical pattern, with the vertical axis of the pattern being longer than the horizontal axis.

A common practice is to form a groove into the substrate to support the optical fiber. Although the groove often prevents lateral movement of the fiber, it also typically increases the difficulty in aligning the fiber with the light source since the elliptical pattern of light emanating from the edge emitter is substantially narrower in the lateral direction. The grooves must, therefore, be precisely placed or else significant amounts of light can be lost, thus degrading the transmitted optical signals.

A VCSEL, either single mode or multimode, may be coupled to optical fibers. The combination of VCSEL and fiber technology is important in fields such as telecommunications. Single mode optical fibers have some advantages over multimode fibers because the core diameter of a single mode optical fiber is much smaller than the core diameter of a multimode optical fiber. The inventors have found that single mode fibers can be useful when combined with laser, and in particular VCSELs, for high-bandwidth telecommunications applications. Single mode fibers are available that are less than 10 microns in diameter. A well-known single mode fiber is what is referred to in the art as the SMF-28, manufactured by Corning Corporation. Furthermore, fiber is generally available that is operable as single mode fiber at 850 nm and is generally about 2–3 microns in diameter. Utilizing a multimode VCSEL in an SMF coupling scheme, however, can result in a system that suffers from poor modulation characteristics and low optical power.

The coupling efficiency of, for example, a multimode VCSEL has been known to change as a function of current and temperature due to the multi-spatial mode nature of the multimode VCSEL. Mode selectivity of the optical intensity of either single mode or multimode VCSELs can lead to problems in the time domain, such as changes in the optical pulse shape and an increase in the noise on the optical signal. Additionally, the associated coupling repeatability to, for example, single mode fiber can be poor because of the structure in the spatial modes.

In summary, there is a general inability in the present field to achieve coupling of single mode or multimode VCSELs (without regard to mode selectivity) into a small diameter fiber with improved alignment tolerances. The present inventors have thus concluded, based on the foregoing, that a need exists for an improved non-mode selective coupling of VCSELs into small diameter fibers, whereby alignment tolerances are improved. The inventors have found that a diffusing surface or other focusing/scattering mechanism can be utilized to mix the optical mode structure of a coupling system. This solution, however, can also result in overfill of an optical fiber, leading to a reduction in the optical signal and promoting modulation problems. The inventors now seek to present solutions to overcome these and other problems in the art.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved optical coupling method and system for coupling lasers to optical fibers.

It is another aspect of the present invention to improve the coupling tolerance of VCSELs coupled to optical fibers.

It is yet another aspect of the present invention to improve the coupling repeatability.

It is still another aspect of the present invention to scramble optical modes associated with multimode laser devices, such as a multimode VCSEL, utilizing an optical scattering surface to eliminate mode selection noise penalties.

It is another aspect of the present invention to scramble optical modes associated with multimode laser devices, such as a multimode VCSEL, using an optical concentrator to eliminate mode selection noise penalties.

The above and other aspects can be achieved as is now described. A plurality of optical modes associated with a laser, for example a multimode VCSEL, are scrambled, and the VCSEL laser light from the multimode VCSEL is generally focused on a fiber facet associated with the optical fiber. Thereafter, the multimode VCSEL can be coupled to the optical fiber to thereby improve coupling repeatability while reducing mode selective coupling of the VCSEL to the optical fiber. The optical modes can be scrambled utilizing an optical scattering surface. A multimode VCSEL can be coupled to the optical fiber by butt-coupling said optical fiber to the multimode VCSEL or by utilizing at least one additional lens for imaging on a particular spot. Additionally, such a particular spot generally comprises a size larger than a core of said optical fiber to thereby reduce coupling variations thereof. The optical fiber can include a single mode optical fiber. The optical modes can also be scrambled, utilizing an optical concentrator configured as a linear, conical or parabolic concentrator (among other shapes), which may be adapted for use in mixing optical modes.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
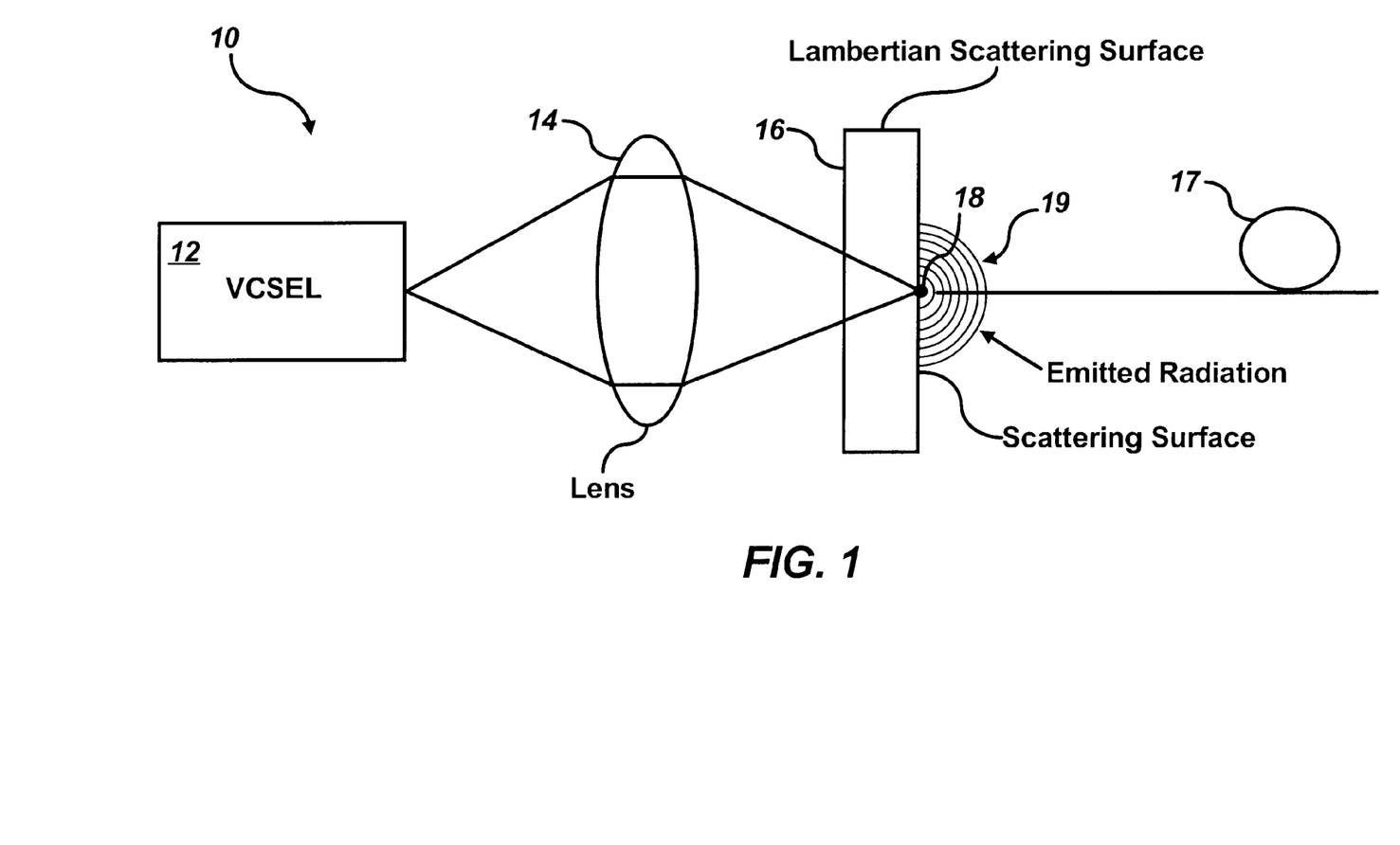
FIG. 1 illustrates a diagram of an optical diffuser approach to coupling a VCSEL to an optical fiber, in accordance with a preferred embodiment of the present invention.

FIG. 1 illustrates a diagram of an optical approach 10 of coupling a VCSEL 12 to an optical fiber 17, in accordance with a preferred embodiment of the present invention. As indicated in FIG. 1, a VCSEL 12 emits laser light, which comes into contact with lens 14. Light passing through lens 14 thus comes into contact with a scattering surface 16. The scattering surface 16 produces a Lambertian-like scattering source 19 wherein optical modes are mixed together. The result is an improved optical signal 18 entering optical fiber 17. Note that an example of a VCSEL device, which may be implemented in accordance with the method and system of the present invention, is a VCSEL laser chip available from the VCSEL Products Division of Honeywell in Richardson, Tex.

Note that light intensity measured from any single emitting point has been observed the present inventors to remain generally constant at all angles measured with respect to a line normal to the front or rear of a diffuser (i.e., the configuration illustrated in FIG. 1 indicates one type of a diffuser that can be used in accordance with the present invention). Light of this nature is generally referred to as Lambertian. When the term "Lambertian" or "Lambertian-like" is used herein, it should be understood that the intent is to describe any scattering profile, ranging from scattering that is uniform in direction to scattering that is highly directional. A "Lambertian surface," for example, generally connotes an idealized surface whose emitted or reflected radiance is independent of viewing angle. As utilized herein, however, the term "Lambertian" is utilized more broadly to denote any rough-scattering surface, which reflects optical radiation in a manner that is largely or substantially invariant with respect to direction. Scattering surface 16 thus comprises a Lambertian-like scattering surface.

Figure 2:
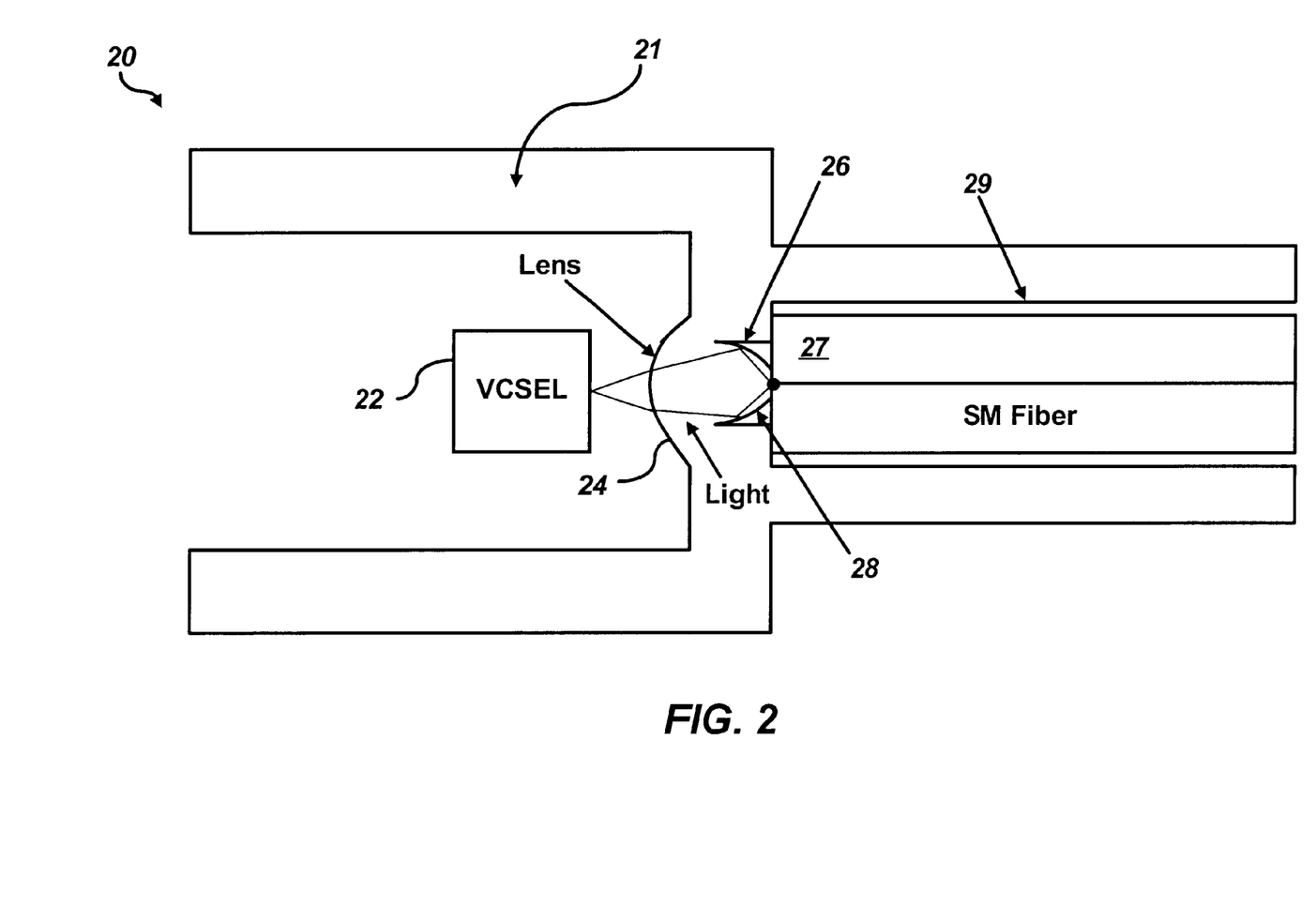
FIG. 2 depicts a diagram of a concentrator approach to coupling a VCSEL to an optical fiber, in accordance with a preferred embodiment of the present invention.

As shown in FIG. 2, coupling of an optical fiber 27 to the coupler 20 can be accomplished by butt-coupling the fiber 27 into the coupler 20 such that it is aligned with optical components, 22 and 26, housed by the coupler 2. A second lens (shown in FIG. 3, element 39) can be further utilized nearest the opening of the optical fiber 27 to further image, or "spot", the optical signal towards the center, or core, of the optical fiber 27. Note that multitransverse mode VCSELs can have far field "spots" that are uniform and near Gaussian. In generating laser light it is preferable to obtain a beam shape that has a normal curve, also known as a "Gaussian" profile, with respect to intensity of the light. A Gaussian beam has desirable qualities, which include an amplitude that falls off smoothly and rapidly with the distance from the axis of light propagation. Such a beam also carries finite, non-zero power across the beam cross section, in contrast to filamented beam profiles which have near zero intensity at certain points. Further, a Gaussian beam retains its profile at more distant planes with respect to the axis of propagation, even after reflections or passage through apertures. The term "near Gaussian" means generally that the shape of the intensity profile is similar to a normal curve.

For example, "donut"-shaped modes (or other non-Gaussian-shaped modes) are also possible. Divergence of the different modes differs and increases as the current is also increased. Imaging such donut modes into a very small region, then diffusing the radiation, allows tolerant coupling to a small fiber to which the donut mode would otherwise couple very poorly.

FIG. 2 depicts a diagram 20 of a concentrator approach to coupling a VCSEL 22 to an optical fiber 27, in accordance with a preferred embodiment of the present invention. As illustrated in FIG. 2, a VCSEL 22 is located opposite a lens 24. The lens in turn is positioned between VCSEL 22 and a linear or parabolic concentrator 26, which can include an optical scattering surface 28. Parabolic concentrator 26 provides a mixing of optical modes, and additionally, scattering surface 28, which is optional, can further mix the modes to thereby provide, for example, a Lambertian-like scattering source. Note that the scattering surface 28 can be placed on the linear or parabolic concentrator 26 utilizing an aerosol, molding, or other technique. Additionally, the scattering surface 28 can be an element separate and apart from the parabolic concentrator 26. A housing 21 can be molded to contain all the components necessary to couple an optical fiber 27 to the VCSEL 22 or lasing source contained within the housing. A receiver 29 formed in the housing can accurately accept (couple) the fiber 27 into the housing 21 in proper alignment to signals provided from the VCSEL 22 in accordance with the teaching of the present invention.

Figure 3:
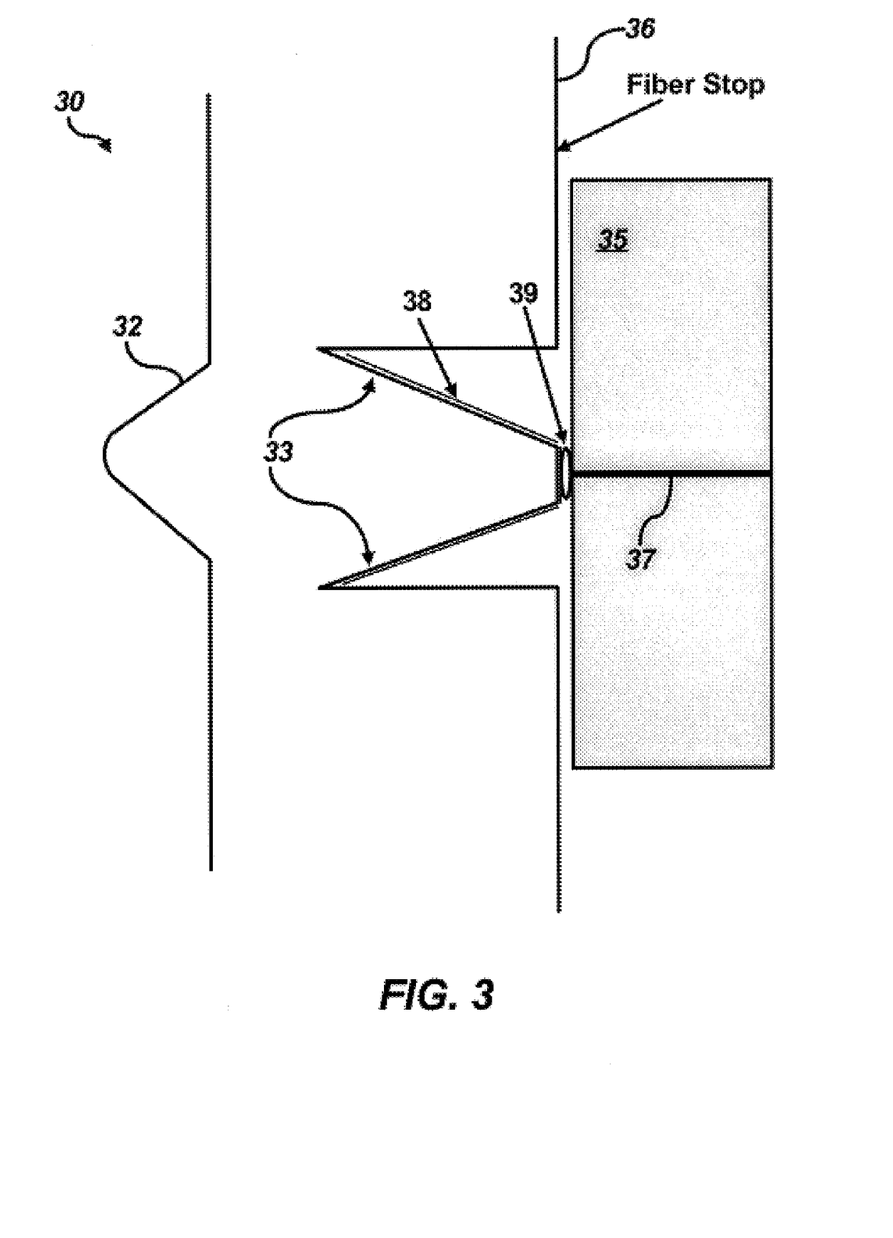
FIG. 3 illustrates a diagram showing a detailed view of a concentrator, which may be implemented in accordance with a preferred embodiment of the present invention.

FIG. 3 illustrates a diagram 30 illustrating a detailed view of a concentrator 33 in accordance with a preferred embodiment of the present invention. As illustrated in FIG. 3, an optical fiber 35 having a core 37 is indicated facing fiber stop 36. Additionally an optical scatterer can be integrated on the surface of the open face of the concentrator 33 facing light passing through lens 32. The design variable for the optics indicated in FIG. 3 includes a curvature of the surface of lens 32 or a degree of collimation. The beam diameter can be embedded in plastic. Additionally, the distance of the lens 32 to a VCSEL (see VCSEL 22 in FIG. 2) can be an important design factor, along with the size of the tip of the concentrator (see FIG. 2). Finally, the length of the concentrator can also be an important design factor. An optional lens 39 can be provided between the concentrator/scatterer arrangement and the fiber 35 to better focus the optical signal onto the fiber facet.

Figure 4:
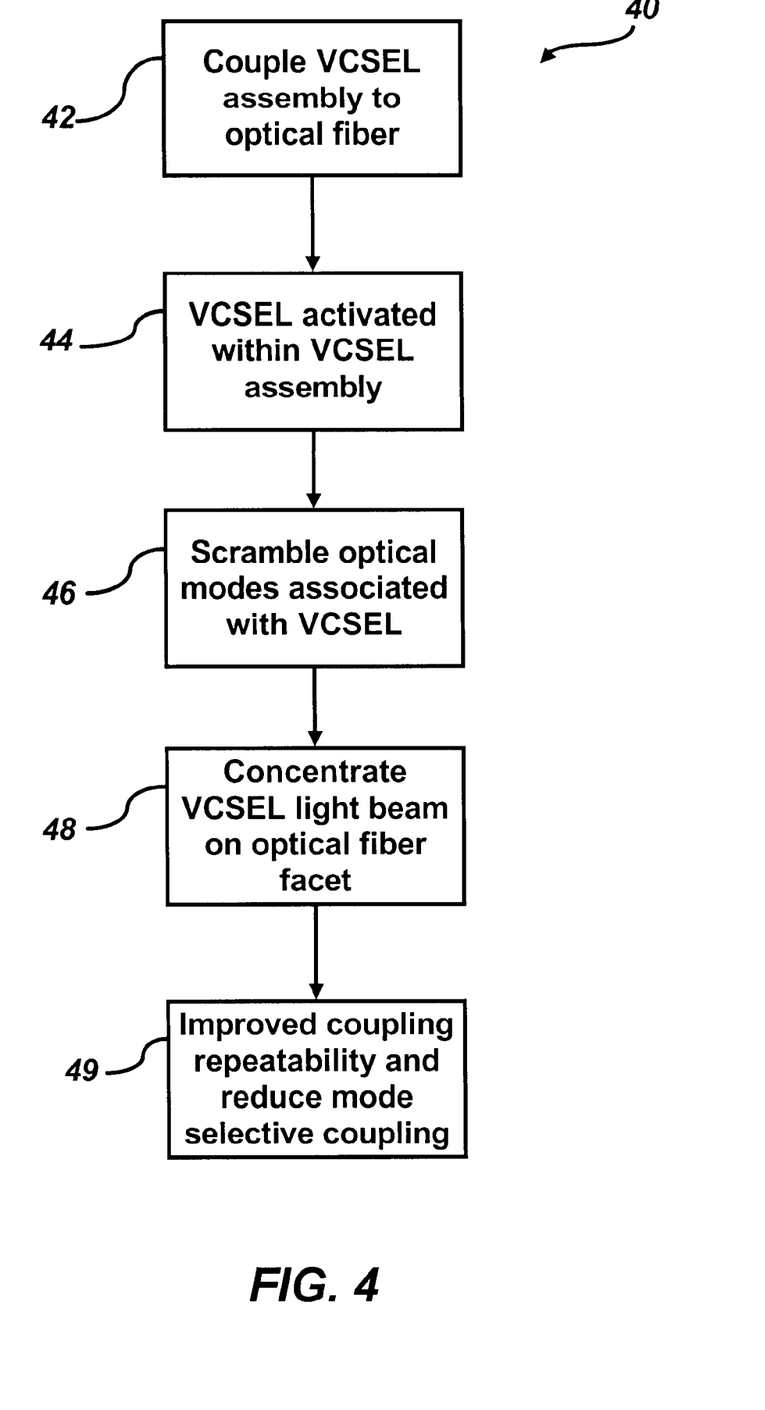
FIG. 4 depicts a flow chart of operations illustrating operational steps that may be implemented in accordance with a preferred embodiment of the present invention.

FIG. 4 depicts a flow chart 40 illustrating operational steps that can be carried out in accordance with a preferred embodiment of the present invention. As illustrated at block 42 a VCSEL assembly can be coupled to the optical fiber. As shown in block 44, a VCSEL light beam is activated through a VCSEL device house in assembly, or as an integral part of a coupling system, such as shown in FIGS. 1-3. Then a plurality of optical modes associated with a VCSEL can be scrambled, as indicated thereafter at block 46. Then, as depicted at block 48, the VCSEL laser light beam from the VCSEL is concentrated on a fiber facet associated with the optical fiber. Thereafter, as shown at block 49, coupling repeatability of the VCSEL signal into the optical fiber is improved while mode selective coupling is reduced. It should be appreciated that either single mode or multimode VCSELs can be coupled to single mode optical fibers using these operational steps.

Figure 5:
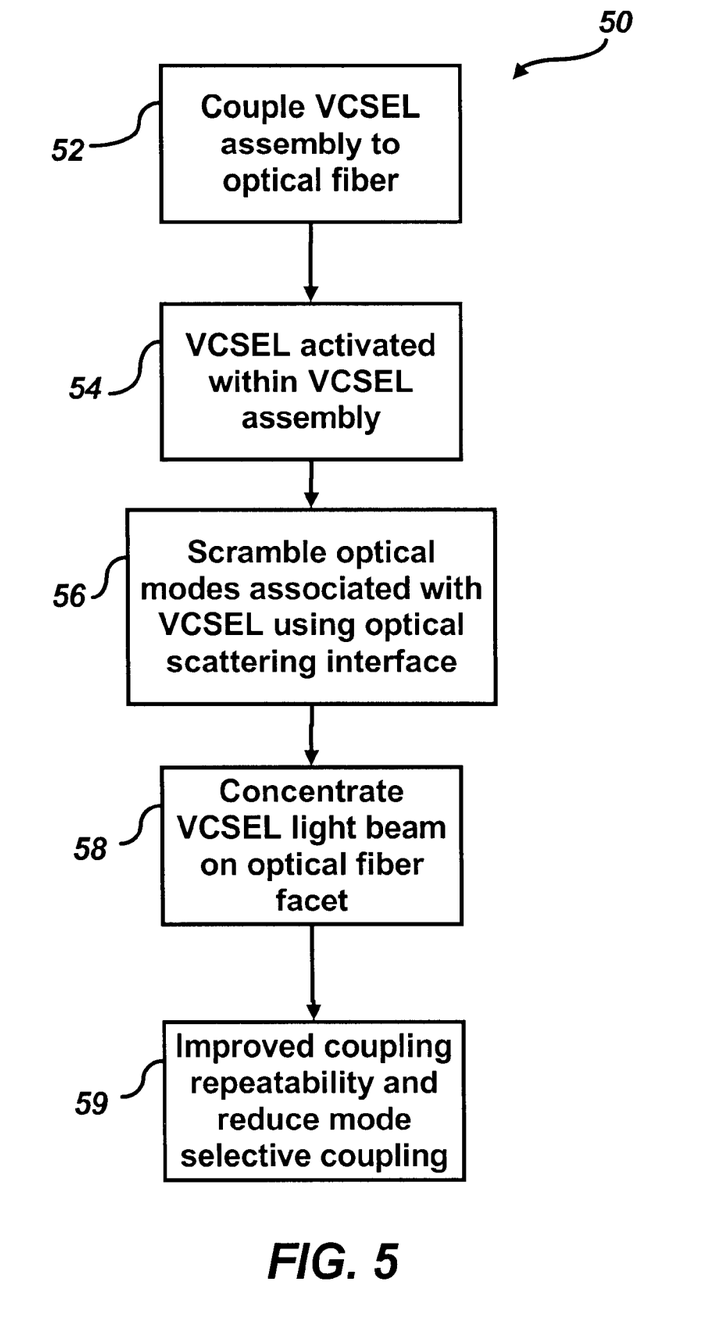
FIG. 5 illustrates a flow chart of operations illustrating operational steps in which optical modes may be scrambled utilizing an optical scattering device, in accordance with a preferred embodiment of the present invention.

FIG. 5 illustrates a flow chart 50 of operations illustrating operational steps in which optical modes may be scrambled utilizing an optical scattering surface, in accordance with a preferred embodiment of the present invention. As indicated at block 52, a VCSEL assembly is coupled to the optical fiber. Thereafter as shown in block 54 a VCSEL light beam may be produced by activating a VCSEL housed in the VCSEL assembly. As illustrated at block 56, a plurality of optical modes associated with a VCSEL can be scrambled utilizing an optical scattering surface, such as, for example the optical scattering surface 38 illustrated in FIG. 3. Such an optical scattering surface can be, for example, a Lambertian-like scattering surface. Then, as depicted at block 58, the VCSEL laser light beam from the multimode VCSEL can be focused on a fiber facet associated with an optical fiber. Finally, as shown at block 59, an improvement is realized in coupling repeatability while reduced mode selective coupling of the VCSEL to the optical fiber also results. Either butt-coupling the fiber, or utilizing a second lens 39 as shown in FIG. 3, to image light signals on a particular spot may accomplish coupling to the fiber. Such a particular spot is generally much larger than the core of an associated single mode optical fiber, which can thereby contribute to a reduction in coupling variation.

Figure 6:
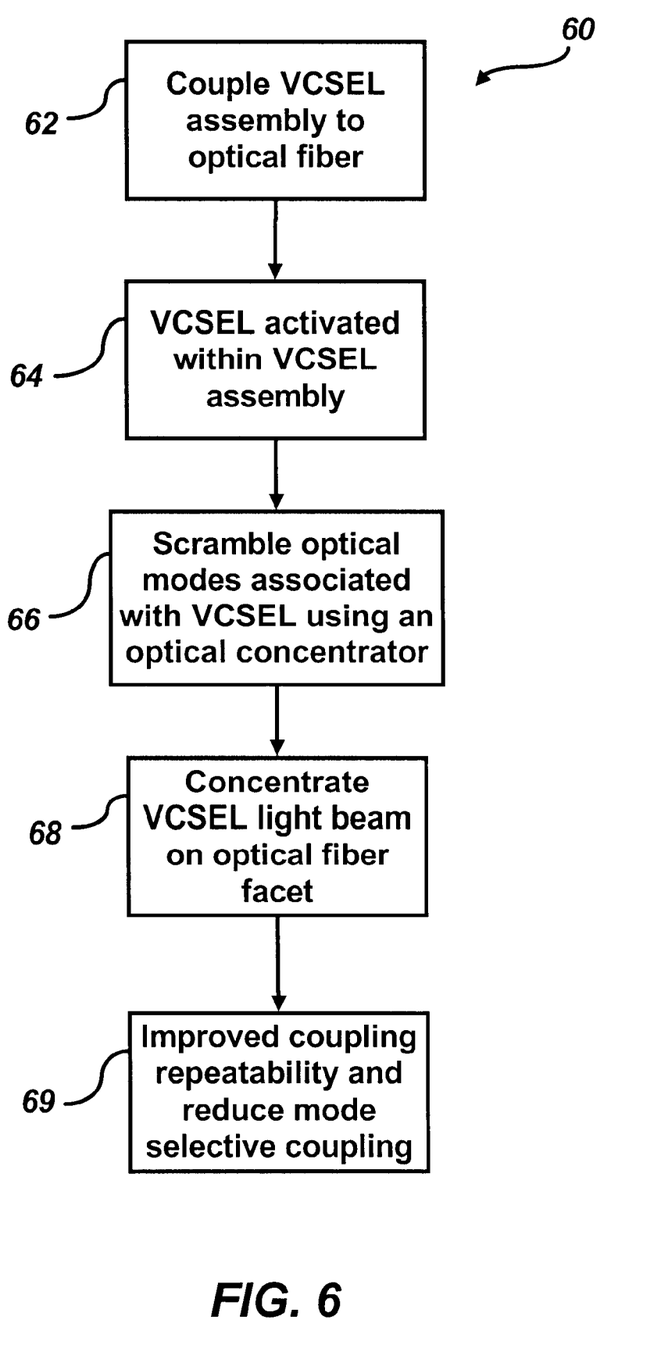
FIG. 6 depicts a flow chart of operations illustrating operational steps in which optical modes may be scrambled utilizing an optical concentrator, in accordance with a preferred embodiment of the present invention.

FIG. 6 depicts a flow chart 60 of operations illustrating operational steps in which optical modes may be scrambled utilizing an optical concentrator, in accordance with a preferred embodiment of the present invention. First, as indicated at block 62, an optical fiber may be coupled to a VCSEL housed within a VCSEL component housing. Thereafter, as shown in block 64, the VCSEL is activated within a device manufactured consistent with the present invention. Then, as shown in block 66, a plurality of optical modes associated with a VCSEL can be scrambled utilizing an optical concentrator, such as, for example the optical concentrator 26 or 33 illustrated in FIG. 2 and FIG. 3, respectively. Such an optical concentrator can be configured as, for example, a linear, conical or parabolic concentrator. Although it should be appreciated by the skilled that other concentrator shapes can be utilized while maintaining coupling capabilities in accordance with the present invention. Additionally, although not shown as a step in FIG. 6, it should be appreciated that a scattering surface can be utilized to mix the modes and thereby provide a near Lambertian like scattering source. After being conditioned through either or both the optical scrambling and scattering optics, the VCSEL laser light beam from the multimode VCSEL can be collected and concentrated onto a fiber facet associated with the optical fiber as shown in block 68. Such concentration can occur through an additional lens 39 as shown in FIG. 3. The result, as shown in block 69, is to thereby improve coupling repeatability while reducing mode selective coupling of the VCSEL's signals to the optical fiber.

Based on the foregoing, it can be appreciated that the present invention disclosed herein generally describes a method and system for coupling a multimode vertical cavity surface emitting laser (VCSEL) to an optical fiber. A plurality of optical modes associated with the multimode VCSEL can be scrambled, and a VCSEL laser light from the multimode VCSEL can be focused on a fiber facet associated with the optical fiber. Thereafter, the multimode VCSEL is coupled to the optical fiber to thereby improve coupling repeatability while reducing mode selective coupling of the VCSEL to the optical fiber. The optical modes are scrambled utilizing an optical scattering surface. Such an optical scattering surface produces a more nearly uniform illumination of the fiber face, both spatially and as a function of angle. The multimode VCSEL can be coupled to said optical fiber by butt-coupling said optical fiber to the multimode VCSEL or by utilizing at least one additional lens for imaging on a particular spot. Additionally, such a particular spot generally comprises a size larger than a core of said optical fiber to thereby reduce coupling variations thereof. The optical modes can also be scrambled utilizing an optical concentrator configured as a parabolic concentrator, which may be adapted for use in mixing optical modes. The optical modes may be mixed utilizing an optical scattering surface to provide a Lambertian-like scattering source.

Also, based on the foregoing, it can be appreciated the method and system of the present invention provides a number of advantages, including the ability to handle data communications at high speed. The present invention is ideal for utilization with single mode fibers currently in use because the configurations presented herein provide minimal alignment tolerances with such single mode fibers. The present invention is also useful with multimode fiber operations, when implemented in the context of a transfer-molded package. "Transfer molding" techniques, for example, are generally utilized when packaging lead frames. Transfer molding is thus a low-cost alternative to more sophisticated, and expensive, techniques.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive nor to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A method for coupling a laser and optical fiber, said method comprising the steps of:

coupling an optical fiber having a core to a laser; and redistributing the intensity profile of said laser onto a fiber facet associated with an optical fiber, thereby improving coupling repeatability while reducing mode selective coupling of said laser to said optical fiber; and scrambling a plurality of optical modes associated with said laser utilizing a parabolic optical concentrator.

2. The method of claim 1 wherein said parabolic optical concentrator can be adapted for use in mixing optical modes.

3. The method of claim 2 further comprising the step of mixing said optical modes utilizing an optical scattering surface to provide a Lambertian scattering source.

4. A system for coupling a laser to an optical fiber, comprising:

a housing;

a laser contained within said housing for providing radiation in a plurality of optical modes; and a parabolic optical concentrator contained within said housing for concentrating said plurality of optical modes;

a scattering surface formed on said parabolic optical concentrator, wherein said plurality of optical modes associated with said laser are scrambled utilizing the scattering surface after being concentrated by said optical concentrator; and an optical fiber receiver formed in said housing for receiving and coupling an optical fiber in a manner whereby said plurality of optical modes are focused onto a fiber facet associated with said optical fiber after passing through said optical concentrator.

5. The system of claim 4 wherein said parabolic concentrator can be adapted for use in mixing optical modes.

6. An optical coupler including a vertical cavity surface emitting laser (VCSEL), comprising:

a housing for coupling an optical fiber having a core to a VCSEL and having an opening for receiving said optical fiber;

a VCSEL contained in said housing; and an parabolic optical concentrator formed within said housing and disposed between said VCSEL and said opening, wherein a plurality of optical modes provided as a signal from said VCSEL are concentrated utilizing said parabolic optical concentrator as laser light from said VCSEL is focused on a fiber facet associated with said optical fiber; and a scattering surface formed on said parabolic optical concentrator between said parabolic optical and said optical fiber wherein said plurality of optical modes are scrambled during transmission through said optical scattering surface.

7. The optical coupler of claim 6, further comprising at least one lens for further focusing radiation toward a concentrated spot near the core of said fiber.

* * * * *